Patented Sept. 29, 1936

2,055,597

UNITED STATES PATENT OFFICE 2,055,597

POLYMERIZATION PROCESS

James H. Werntz, Marshallton, Del., assignor to E. I. du Pont de Nemours & Company, Wilmington, Del., a corporation of Delaware No Drawing. Application October 31, 1933, Serial No. 696,005

20 Claims. (Cl. 260—2)

This invention relates to an improved process for the manufacture of soluble polymers of divinylacetylene. More particularly it relates to a process of inhibiting formation of insoluble polymers or gels of divinylacetylene by effecting the polymerization in the presence of iodine.

It is an object of this invention to provide a process of forming polymers of divinylacetylene. It is a further object of the invention to provide an improved process for forming soluble polymers of divinylacetylene. A still further object of the invention is to provide an improved process for the manufacture of soluble inter-polymers of divinylacetylene and other substances. Other objects will appear hereinafter.

These objects are accomplished by the following invention: The divinylacetylene, alone or with other substances, is polymerized in the presence of iodine which inhibits the formation of insoluble polymers but does not function as an antioxidant in retarding the rate of polymerization of divinylacetylene. Divinylacetylene, either crude or isolated from the crude by fractional distillation, is heated at 85° C. to 90° C. in an atmosphere of nitrogen or carbon dioxide in the presence of 0.1 to 0.5% iodine. If the course of the polymerization is followed by the determination of the amount of non-volatile polymers present after the various intervals of heating it is found that the iodine does not show any retarding effect on the rate of polymerization but that time required for gelling is extended considerably, with the result that the amount of soluble polymer isolated is at least twice as great as is ordinarily obtained when no anti-gelling agent is present.

Example 1

Divinylacetylene, boiling over a 1° range, after being heated in an atmosphere of carbon dioxide at 85°–90° C. for three hours contained 14% of non-volatile polymers. It gelled shortly thereafter. When 0.1% of iodine was added to the divinylacetylene and the whole heated three hours at 85°–90° C. the amount of non-volatile polymers was 14.1%. The product did not gel after heating five hours. When the divinylacetylene was heated with 0.5% guaiacol at 85°–90° C. for three hours only 11% non-volatile polymers had formed and gelation occurred in four hours.

Example 2

Divinylacetylene was heated at 85°–90° C. in an atmosphere of carbon dioxide. After four hours 10.5% of non-volatile polymers was present and gelation occurred shortly thereafter. When polymerization was carried out in the presence of 0.5% iodine, the amount of non-volatile polymers after heating four hours amounted to 10.8%. After heating ten hours the amount of non-volatile polymers was 25% and gelation occurred only after heating twelve hours. When divinylacetylene was polymerized in the presence of 0.5% hydroquinone or 0.5% phenyl-beta-naphthylamine, gelation occurred after heating three hours.

Iodine may be employed when divinylacetylene is polymerized in a solvent such as toluene, xylene, acetone, or in the presence of drying oils and blending agents such as ester gum. Iodine may also be employed when divinylacetylene is polymerized in the presence of; (1) polymerizable compounds such as styrene, vinyl acetate, vinyl chloride, formaldehyde (with or without acetone), methyl methacrylate, diethyl fumarate, etc., or mixtures thereof; (2) two or more ingredients which unite to form resins, such as phenols and aldehydes (or ketones); amines and aldehydes; polyhydric alcohols and polycarboxylic acids, with or without ester (e. g. fatty oil), monohydric alcohol, or monocarboxylic acid modifiers; polyhydric phenols and polybasic acid halides; polyhydric phenols and aliphatic dihalides; etc.; (3) preformed resins of the types mentioned in (1) and (2), also others, such as chlorinated diphenyl and chlorinated naphthalene; (4) other film-forming materials, such as drying oils; (5) non-drying and hydroxylated fatty oils such as coconut and castor oils; (6) natural resins and their esters, such as dammar, Congo, Manila and ester gum; (7) various softeners; (8) cellulose derivatives, for example, nitrocellulose, cellulose acetate, benzyl cellulose and ethyl cellulose. The polymerization may be carried out in the presence of air but an inert atmosphere such as nitrogen or carbon dioxide is preferred. The temperatures at which the process is most satisfactorily carried out lie between 20° C. and 100° C. although higher temperatures may be employed. Best results, however, are obtained within the above range and at or above 85° C. The polymerization is customarily carried out at atmospheric pressure although lower or higher pressures may be employed.

This invention may be applied not only to the formation of polymers from divinylacetylene which has been isolated from the crude by fractional distillation but it may also be applied to crude divinylacetylene, such, for example, as that which is prepared according to Nieuwland U. S.

Patent No. 1,811,959. As indicated above the preferred amount of iodine to be used is .1 to .5% of the weight of divinylacetylene, however, larger and smaller amounts may be used, e. g., .01 to 5% iodine may be used. It has been found to be desirable frequently to remove any free iodine at the end of the polymerization process. This can be done by washing with aqueous sodium thiosulfate or similar salt which reacts with iodine.

The conversions to soluble divinylacetylene polymers obtained by the use of iodine are more than double those obtained when no iodine is employed. Furthermore, the suppression of insoluble polymer formation evidenced by the extension of time required for gelling permits of much better control of the polymerization process. Moreover this agent does not influence the chemical inertness of coating compositions comprising these polymers. The use of iodine is particularly desirable in the manufacture of soluble resins which possess the property of drying rapidly to hard films, while the use of antioxidants such as pyrogallol, thiodiphenylamine, or catechol during polymerization result in the production of resins which dry slowly to hard films.

The polymers prepared by this preferred process may be employed in coating or impregnating compositions for wood, stone, leather, cloth, paper, metal, rubber, glass, and any synthetic resins. They may be used in clear finishes or with pigments in enamels. The polymers may be mixed with wood flour, ground cork, or mineral filler for use in plastics. These resinous polymers may be used in coating compositions representing combinations with cellulose derivatives such as cellulose nitrate or ethyl cellulose, with the natural gums or resins, with synthetic resins, with softeners or plasticizers, with pigments, with bituminous materials, with oils such as the drying or semi-drying oils, with antioxidants, and with dyes.

The above description and specific examples are illustrative only and are not intended to limit the scope of the invention. Any modification thereof or variation therefrom is intended to be included within the scope of the claims.

I claim:

1. The process of inhibiting the formation of insoluble polymers which comprises polymerizing divinylacetylene in the presence of iodine.

2. The process of inhibiting the formation of insoluble polymers which comprises polymerizing divinylacetylene in the presence of iodine and at a temperature of 20° C. to 100° C.

3. The process of inhibiting the formation of insoluble polymers which comprises polymerizing divinylacetylene in the presence of iodine, then discontinuing the polymerization before a gel is formed and thereafter removing the free iodine.

4. The process which comprises polymerizing divinylacetylene in the presence of iodine, then discontinuing the polymerization before a gel is formed and drying the polymer in a thin film.

5. The process which comprises polymerizing divinylacetylene in the presence of iodine at a temperature of 85° to 100° C.

6. The process which comprises polymerizing divinylacetylene in the presence of iodine and then removing any free iodine.

7. The process which comprises polymerizing divinylacetylene in the presence of iodine at a temperature of 20° C. to 100° C. and then removing any free iodine.

8. The process which comprises polymerizing divinylacetylene in the presence of iodine and a paint or varnish modifying agent of the class consisting of preformed resins, softeners and cellulose derivatives.

9. The process which comprises polymerizing divinylacetylene in the presence of a resin forming polymerizable material and iodine.

10. The process which comprises polymerizing divinylacetylene in the presence of iodine and a drying oil.

11. The process which comprises polymerizing divinylacetylene in the presence of iodine and a pre-formed resin.

12. The process which comprises polymerizing divinylacetylene in the presence of iodine and a cellulose derivative.

13. A product obtained by the process of claim 8.

14. A material comprising a soluble film-forming polymer of divinylacetylene, another resinous material and iodine, prepared by polymerizing divinylacetylene in the presence of the other constituents of the material.

15. A product obtained by the process of claim 11.

16. A product obtained by the process of claim 12.

17. A product produced by the process of claim 10.

18. A product obtained by the process of claim 1.

19. A product obtained by the process of claim 9.

20. The process of inhibiting the formation of insoluble polymers which comprises polymerizing divinylacetylene in the presence of .1% to .5% of iodine at 20° C. to 100° C. and discontinuing the polymerization before a gel is formed.

JAMES H. WERNTZ.